(12) United States Patent
Weld et al.

(10) Patent No.: US 11,294,899 B2
(45) Date of Patent: *Apr. 5, 2022

(54) DEFINING SUBGRAPHS DECLARATIVELY WITH VERTEX AND EDGE FILTERS

(71) Applicant: Oracle International Corporation, Redwood Shores, CA (US)

(72) Inventors: Alexander Weld, Mountain View, CA (US); Korbinian Schmid, San Mateo, CA (US); Sungpack Hong, Palo Alto, CA (US); Hassan Chafi, San Mateo, CA (US); Hyungyu Shin, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 16/548,687

(22) Filed: Aug. 22, 2019

(65) Prior Publication Data
US 2019/0377735 A1    Dec. 12, 2019

Related U.S. Application Data

(63) Continuation of application No. 15/592,050, filed on May 10, 2017, now Pat. No. 10,445,319.

(51) Int. Cl.
*G06F 17/30* (2006.01)
*G06F 16/2453* (2019.01)
(Continued)

(52) U.S. Cl.
CPC ...... *G06F 16/24535* (2019.01); *G06F 16/248* (2019.01); *G06F 16/252* (2019.01); *G06F 16/278* (2019.01); *G06F 16/9024* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 5,765,177 A * 6/1998 Nakatsuyama ....... G06F 40/151
715/209
5,913,038 A    6/1999 Griffiths
(Continued)

OTHER PUBLICATIONS

Weld, U.S. Appl. No. 15/592,050, filed May 10, 2017, Notice of Allowance dated May 22, 2019.
(Continued)

*Primary Examiner* — Hung D Le
(74) *Attorney, Agent, or Firm* — Hickman Becker Bingham Ledesma LLP

(57) ABSTRACT

Techniques herein optimally distribute graph query processing across heterogeneous tiers. In an embodiment, a computer receives a graph query to extract a query result (QR) from a graph in a database operated by a database management system (DBMS). The graph has vertices interconnected by edges. Each vertex has vertex properties, and each edge has edge properties. The computer decomposes the graph query into filter expressions (FE's). Each FE is processed as follows. A filtration tier to execute the FE is selected from: the DBMS which sends at least the QR to a stream, a stream evaluator that processes the stream as it arrives without waiting for the entire QR to arrive and that stores at least the QR into memory, and an in-memory evaluator that identifies the QR in memory. A translation of the FE executes on the filtration tier to obtain vertices and/or edges that satisfy the FE.

20 Claims, 10 Drawing Sheets

(51) Int. Cl.
 *G06F 16/248* (2019.01)
 *G06F 16/25* (2019.01)
 *G06F 16/901* (2019.01)
 *G06F 16/27* (2019.01)

(56) References Cited

U.S. PATENT DOCUMENTS

| | | |
|---|---|---|
| 6,580,430 B1 | 6/2003 | Hollis |
| 6,717,599 B1 | 4/2004 | Olano |
| 7,146,366 B2 * | 12/2006 | Hinshaw ............. G06F 16/2308 |
| 7,890,518 B2 | 2/2011 | Aasman |
| 8,134,561 B2 | 3/2012 | Harper |
| 8,704,837 B2 | 4/2014 | Harper |
| 8,719,917 B1 | 5/2014 | Ammundi |
| 9,208,207 B2 | 12/2015 | Venkataramani |
| 9,454,567 B2 | 9/2016 | Hu |
| 2002/0099870 A1 | 7/2002 | Miller |
| 2003/0222870 A1 | 12/2003 | Driemeyer |
| 2005/0231516 A1 | 10/2005 | Zimmer |
| 2009/0094087 A1 * | 4/2009 | Chung ................... G06Q 10/08 705/7.11 |
| 2012/0130942 A1 * | 5/2012 | Dipper ................. G06F 16/254 707/602 |
| 2012/0209886 A1 * | 8/2012 | Henderson ............ G06F 16/211 707/798 |
| 2014/0067781 A1 * | 3/2014 | Wolchok ............. G06F 16/9024 707/701 |
| 2014/0067850 A1 * | 3/2014 | Schrock ................ G06F 16/532 707/769 |
| 2014/0172914 A1 * | 6/2014 | Elnikety ............. G06F 16/9024 707/774 |
| 2014/0244687 A1 * | 8/2014 | Shmueli .................. G06F 16/28 707/780 |
| 2014/0297621 A1 | 10/2014 | Hu |
| 2015/0293931 A1 * | 10/2015 | Lee ................... G06F 16/90324 707/728 |
| 2015/0381515 A1 | 12/2015 | Mattson |
| 2016/0117538 A1 | 4/2016 | Akulis |
| 2017/0147705 A1 * | 5/2017 | Kasperovics ....... G06F 16/2433 |
| 2017/0371675 A1 * | 12/2017 | Chen ..................... G06F 9/3867 |
| 2018/0165361 A1 * | 6/2018 | Erickson ............... H04L 41/145 |
| 2018/0329953 A1 | 11/2018 | Weld |

OTHER PUBLICATIONS

Weld, U.S, Appl. No. 15/592,050, filed May 10, 2017, Office Action dated Dec. 11, 2018.
W3C, "SPARQL Query Language for RDF", dated Mar. 26, 2013, 87 pages.
Neo4j, "Tutorial: Import Data Into Neo4j", https://neo4j.com/developer/guide-importing-data-and-etl/, dated 2016, 9 pages.

* cited by examiner

DEFINING SUBGRAPHS DECLARATIVELY WITH VERTEX AND EDGE FILTERS

PRIORITY CLAIM; RELATED APPLICATION

This application claims the benefit as a continuation of U.S. patent application Ser. No. 15/592,050, filed May 10, 2017, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application.

FIELD OF THE DISCLOSURE

This disclosure relates to graph query processing. Techniques are presented for optimally distributing graph query processing across heterogeneous tiers.

BACKGROUND

Graph analysis recently became important for big data analysis. Two systems for graph processing are established among data scientists.

The first is graph database management systems (DBMS's). Graph DBMS's focus on persisting graphs. They provide special functionality for storing, retrieving, and modifying graphs in a transactional manner. Examples are neo4j and Oracle big data appliance (BDA).

Graph DBMS's store the data on nonvolatile media such as hard disk drives (HDDs) or solid state drives (SSDs). These drives, such as used by Oracle Exadata, can hold huge amounts of data on the order of a petabyte.

The second solution is graph analytic engines. These engines focus on analyzing graphs. They specialize on analytic speed and retrieval of nontrivial information. Examples are giraph, GraphX, Turi, and Oracle parallel graph analytics (PGX).

Graph analytic engines typically load the whole data into the main memory of the computer. The amount of available memory on modern computers is only on the order of ten terabytes. The benefit of memory is that it has much faster access than HDDs and SSDs, which makes memory better for analysis workloads.

A typical work flow may be:
1. Store/update the original graph in the graph database;
2. Load a snapshot of the graph from the graph database into the graph analytic engine, perhaps on a separate computer than the graph database;
3. Run analyses on the graph stored in memory using the graph analytic engine; and
4. Send the results back to the graph DBMS for persistence The lower capacity of memory creates a problem when a graph needs to be loaded into the graph analytic engine for analysis purposes. If the graph is too big for main memory, engine throughput may degrade due to swapping.

Often only a specific subset of the original graph, i.e. a subgraph, may be of interest to the user. For example, only the subgraph containing information from a specific time period might be interesting for analysis. In such a case, the user wants to specify the interesting subgraph which becomes small enough to fit within the size constraints of the main memory.

Furthermore, composing a graph query is typically done manually. The user may need to compose a different query for each different graph storage system. This may require knowledge of data formats, text files, and databases such as relational, NoSQL, and HBASE. Accepting and evaluating ad hoc queries from users could pose a security risk, for example through SQL injection and related attacks.

DETAILED DESCRIPTION

Figure 1:
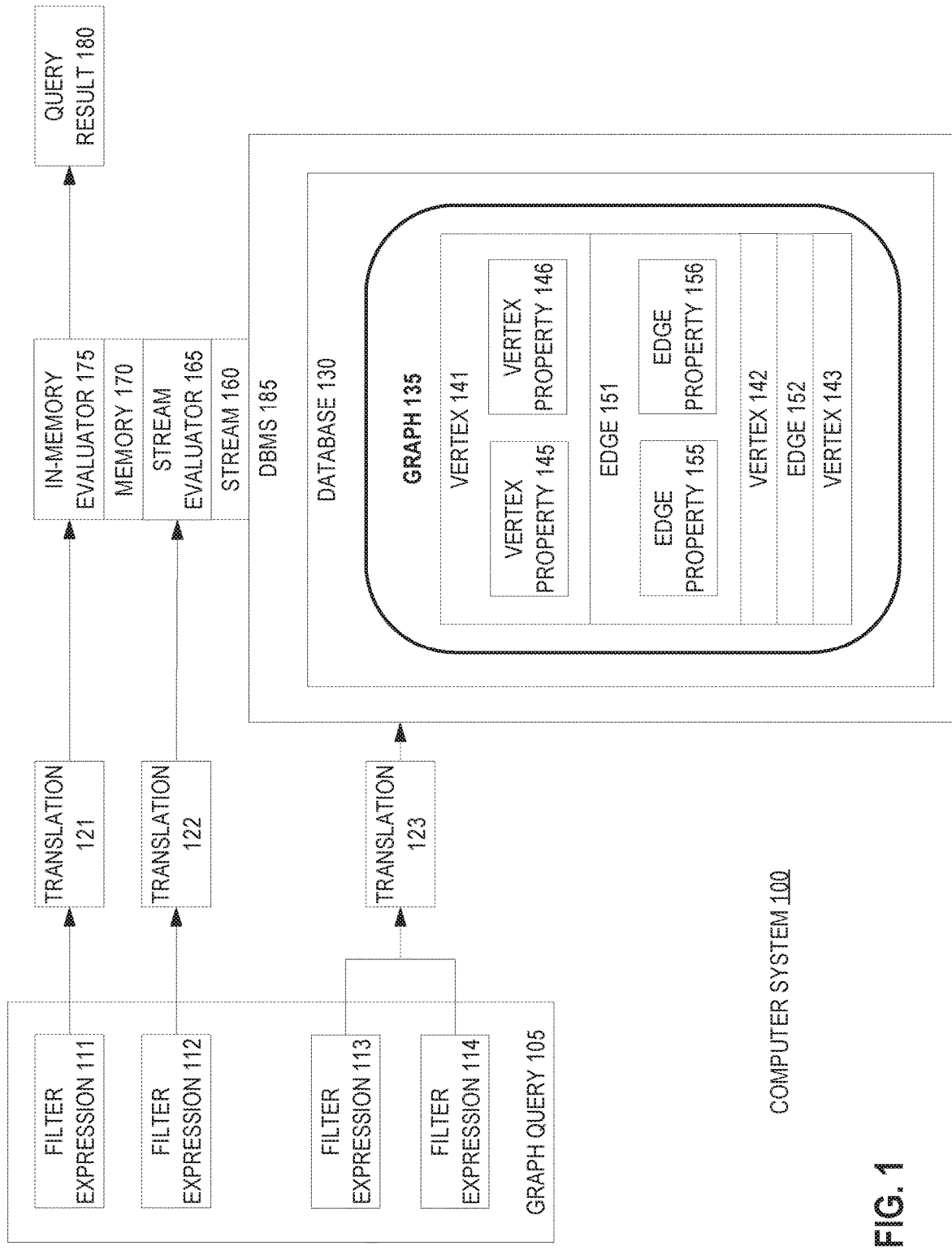
FIG. 1 is a block diagram that depicts an example computer system that optimally distributes graph query processing across heterogeneous tiers, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer System
   2.1 Database
   2.2 Graph
   2.3 Properties
   2.4 Query
      2.4.1 Filter Expression
      2.4.2 Keywords
      2.4.3 Compound Expression
   2.5 Filtration Tiers
      2.5.1 Heterogeneous Tiers
      2.5.2 Costly Joins
      2.5.3 Combining Expressions
      2.5.4 Pipeline Concurrency 2.5.5 Stream
2.5.6 Memory
2.6 Heuristics
2.6.1 Rules
2.7 Tooling
3.0 Filter Expression Distribution Process
3.1 Preparation
3.2 Filter Iteration
3.2.1 Marking Phase
3.2.1.1 Marking Pseudocode
3.2.2 Decomposition Phase
3.2.2.1 Decomposition Pseudocode
3.2.3 Execution
4.0 Example Table
4.1 Translation
4.2 Projection
4.3 Template
4.4 Relational Join
4.4.1 Edge Traversal
5.0 Tier Reassignment
6.0 De Morgan's Laws
6.1 Applying De Morgan
6.1.1 Pattern Detection
6.1.2 De Morgan Rewrite
7.0 Stream Evaluation Process
8.0 In-Memory Evaluation Process
9.0 Hardware Overview
1.0 General Overview Techniques are provided for optimally distributing graph query processing across heterogeneous "graph processing tiers". In an embodiment, a computer receives a graph query to extract a query result from a graph that occupies a database. The graph has vertices that are interconnected by edges. Each vertex has vertex properties, and each edge has edge properties. The computer decomposes the graph query into filter expressions. The computer processes each filter expression as follows.

A filtration tier to execute the filter expression is selected. Available filtration tiers include:
  the database management system (DBMS) which sends at least the query result to a stream,
  a stream evaluator that processes the stream as it arrives from the DBMS without waiting for the entire query result to arrive and that stores at least the query result from the stream into memory, and
  an in-memory evaluator that identifies the query result in the memory.

A translation of the filter expression is executed on the filtration tier to obtain a subset of vertices and/or edges of the graph that satisfy the filter expression.

In an embodiment, rules and heuristics determine which filtration tier should execute which filter expressions. In an embodiment, query rewriting according to De Morgan's Laws allows optimal assignment of filter expressions to filtration tiers.

In an embodiment, a relational DBMS (RDBMS) stores the graph as properties in table(s). In an embodiment, properties of a same name or datatype occupy a same table of multiple property tables. In an embodiment, the mapping of properties to tables is based on a dictionary of table aliases.

2.0 Example Computer System

FIG. 1 is a block diagram that depicts an example computer system 100, in an embodiment. Computer system 100 optimally distributes graph query processing across heterogeneous tiers.

Computer system 100 may be composed of one or more computers, including rack servers such as blades, personal computers, mainframes, network appliances, virtual machines, smartphones, or other computing devices. Computer system 100 may access data that is stored in memory, on disks, or over a network.

Computer system 100 includes three graph filtration tiers, which are in-memory evaluator 175, stream evaluator 165, and database management system (DBMS) 185. Processing tiers 185, 165, and 175 may be collocated on a same computer or distributed on separate computers.

2.1 Database

DBMS 185 may be common off the shelf (COTS) software or other middleware that provides administration and/or transactions for one or more databases. In a preferred embodiment, processors 165 and 175 are collocated within a same software process, while DBMS 185 resides on a separate computer. For example, a remote client of computer system 100 may use open database connectivity (ODBC) to interact with DBMS 185, which manages database 130.

Database 130 may be a graph database, a relational database, a columnar database, a tuple store, a resource description framework (RDF) triplestore, a key-value store, or other bulk data store such as a NoSQL database, Apache HBase, or Google BigTable.

2.2 Graph

Stored within database 130 is graph 135. Graph 135 contains vertices, such as 141-143, that are interconnected by edges, such as 151-152.

Graph 135 may be immense. For example in year 2014, an Oracle Exadata machine processed a query against an RDF graph having a trillion edges.

Although shown as a chain, in other examples graph 135 may have another logical topology that includes trees or cycles. Graph 135 may be cyclic or acyclic. Graph 135 may be connected or disconnected. Its edges may or may not be directed.

2.3 Properties

Vertices and edges may have properties, such as 145-146 and 155-156. A property may have a value and/or a name. A label may be an unnamed property.

Property names may be shared by vertices and/or edges. For example, all edges may have a property named 'weight'.

Not all vertices and/or edges need to have a property of a same name. For example, some edges may lack a weight property.

2.4 Query

In operation, computer system 100 receives or generates graph query 105 to extract information from graph 135, such as query result 180. Graph query 105 may be declarative, idempotent, and/or without side effects. For example, graph 135 or database 130 may be read only. Such aspects allow graph query 105 to be decomposed and distributed without compromising correctness.

Graph query 105 may conform to a query grammar such as structured query language (SQL), Cypher, Sparql,)(Path, cascading style sheet (CSS) such as a selector, or JavaScript. Depending on its query language, graph query 105 may specify pattern matching according to a regular expression, such as a conjunctive regular path query or a context-free path query.

2.4.1 Filter Expression

Graph query 105 may contain many criteria that query result 180 should satisfy. For example, graph query 105 may request coastal cities (vertices) that are connected by dirt roads (edges) to landlocked cities.

Each criterion may appear within graph query 105 as a filter expression, such as 111-114. For example, "edge.surface='dirt'" may be a filter expression.

Filter expressions 111-114 may be declarative, idempotent, and/or without side effects. Filter expressions 111-114 are pure expressions if they are idempotent and without side effects.

2.4.2 Keywords

Graph query 105 may contain topological keywords such as 'vertex' and 'edge' to visit each vertex or edge of graph 135. Such a keyword may appear with a property name, such as "edge.surface".

Vertices and edges may have implicit (predefined) properties. For example, a vertex may have predefined 'indegree' and 'out-degree' properties that count fan in or fan out to neighboring vertices.

For example, each edge may have predefined 'source' and 'destination' properties to access a vertex that the edge connects. Keyword 'source' may be syntactic shorthand for the expression "edge.source". Likewise for destination.

For example, "destination.coastal=false" may express roads that lead to landlocked cities. A logical-not operator may occur for a Boolean property, such as "NOT destination.coastal".

2.4.3 Compound Expression

Filter expressions are composable, such as with binary logical operators such as 'and' or 'or'. For example, "edge.surface='dirt' AND NOT destination.coastal".

Operator precedence may be pre-defined and also overridden such as with parentheses. For example, "vertex.population<100,000 AND (edge.surface='dirt' OR edge.lanes<2)".

2.5 Filtration Tiers

In operation, processing graph query 105 causes data to flow out of database 130, through stream evaluator 165, and into in-memory evaluator 175. Filtration may occur at each of filtration tiers 185, 165, and 175.

Effectively, these tiers form a filtration pipeline. Thus, each filtration tier may pass along to the next filtration tier less data than it received from the previous filtration tier.

2.5.1 Heterogeneous Tiers

Depending on embodiment, DBMS 185 may or may not support all of the semantics of graph query 105. For example if graph query 105 is context free, but DBMS 185 only accepts SQL (which lacks context-free queries), then DBMS 185 may be unable to completely fulfil graph query 105.

2.5.2 Costly Joins

Likewise, some graph operations such as edge traversal may consume too much time or memory to be efficiently executed by DBMS 185. For example, edge traversal such as with a filter expression that specifies "source.color=destination.color" may entail two relational joins, which may be expensive.

Whereas because average join cost is quadratic, such joins may be less expensive if performed later in the filtration pipeline where less data remains. For example, a join may be more efficiently performed by in-memory evaluator 175 than by DBMS 185.

Each filtration tier 130, 165, and 175 may implement filter expressions differently. For example, DBMS 185 may use SQL. Whereas, stream evaluator 165 may expect proprietary method invocations into its software implementation.

Thus, computer system 100 translates filter expressions 111-114 differently, depending on which filtration tier takes which translated filter expressions, shown as translations 121-123. For example, translation 121 is generated from filter expression 111 and sent to in-memory evaluator 175 for execution.

2.5.3 Combining Expressions

Multiple filter expressions, such as 113-114, may be dispatched to a same filtration tier. In an embodiment as shown, filter expressions 113-114 are together translated as a unit into translation 123.

In an embodiment not shown, filter expressions 113-114 are translated separately. Their translations may be concatenated (combined) into a compound translation that is sent to that filtration tier. For example, translations may be concatenated and sent to DBMS 185 in a single SQL statement.

2.5.4 Pipeline Concurrency

The filtration pipeline may achieve pipeline concurrency. For example, some or all filtration tiers may be reacting to graph query 105 at the same time.

For example, DBMS 185 may process a compound translation to generate stream 160 of partial results (such as tuples) that is received by stream evaluator 165. Included within stream 160 is query result 180, which is likely diffusely embedded within extraneous results because DBMS 185 executes only translation 123, which does not include all of the filtration of graph query 105.

2.5.5 Stream

Stream evaluator 165 may have a buffer that functions as a sliding window to temporarily store a small and current portion of stream 160 for filtering per translation 122. Stream evaluator 165 may achieve pipeline concurrency by processing some data from stream 160 before DBMS 185 has finished sending more data for query 105.

Stream evaluator 165 is software that may be or include an event stream processor (ESP) or complex event processor (CEP) such as Oracle Event Processor, Apache Storm, Apache Samza, Apache Spark, or Sybase Aleri. Stream evaluator 165 may be or include a data stream management system (DSMS).

Stream evaluator 165 may be or include a simple API (application programming interface) for XML (extensible markup language), i.e. SAX, parser. For example, DBMS 185 may respond to an XML query (XQuery) by emitting XML into stream 160.

Stream evaluator 165 discards data that fails to satisfy translation 122. For example, if translation 122 specifies blue vertices, then stream evaluator 165 discards vertices of other colors.

Data that satisfies translation 122 is sent to memory 170 by stream evaluator 165. Stream evaluator mechanics are discussed in more detail for FIG. 8 later herein.

2.5.6 Memory

For example, stream evaluator 165 may unmarshall the streamed data into object-oriented structures for storage within memory 170. For example, unmarshalling may involve a data binding framework such as Java deserialization, Java data objects (JDO), enterprise Java bean (EJB) persistence, or Java architecture for XML binding (JAXB).

Thus, memory 170 may store the data as a logical graph or tree, such as a document object model (DOM). Because memory 170 only receives data that has already been filtered by filtration tiers, in-memory evaluator 175 may have little data to process and may perform operations that may be too expensive for other filtration tiers to perform, such as joins.

In-memory evaluator 175 may be software that operates on memory-stored data structures. For example, in-memory evaluator may be a DOM processor or other software that traverses memory-resident data structures, such as according to a visitor design pattern. Either or both of in-memory evaluator 175 and stream evaluator 165 may be software that conforms to an iterator design pattern.

For example, memory 170 may be a dynamic random access memory (DRAM) within which in-memory evaluator 175 may quickly traverse an object graph of intermediate results without thrashing virtual memory. Furthermore, in-memory evaluator 175 may be multithreaded. For example, portions of the intermediate object graph in memory may be assigned to different processor cores for traversal and filtration.

However, in-memory evaluator 175 may lack pipeline concurrency because a typical embodiment waits until stream evaluator 165 has finished filtering all of stream 160. Thus, in-memory evaluator 175 may be high latency (bad) and high throughput (good). In-memory evaluator mechanics are discussed in more detail for FIG. 9 later herein.

2.6 Heuristics

Generally, filtration involving constants is inexpensive, but may be highly effective at eliminating noise (unwanted graph data). Thus, filter expressions such as "edge-.weight<1.5" should be pushed down to DBMS 185 for execution.

Generally, early filtration is more efficient that later filtration. Thus, DBMS 185 is generally more efficient at filtration than stream evaluator 165. Remote database filtration may prevent network congestion.

Likewise, stream evaluator 165 is generally more efficient than in-memory evaluator 175. Stream filtration may prevent memory exhaustion.

At the end of the filtration pipeline is in-memory evaluator 175, which may be any filtration software such as a visitor pattern that can inspect and compare arbitrary vertices and/or edges with each other to accomplish arbitrary joins. Memory processor 175 executes the remaining filter translations to extract query result 180 that may be returned to a client or consumed by computer system 100.

Filter expressions that should be executed by a same filtration tier may be concatenated into a compound expression and/or compound translation.

2.6.1 Rules

A filter expression that reads a degree (count of fan in or out) of a vertex should be executed by in-memory evaluator 175.

A filter expression that compares a constant and does not read a neighbor vertex (i.e. does not traverse an edge) should be executed by DBMS 185.

By default, other filter expressions should be executed by stream evaluator 165.

2.7 Tooling

Computer system 100 may simultaneously process multiple graph queries against graph 135 or other graphs to extract multiple query results 180. Query result 180 may contain zero or more subgraphs, vertices, edges, or property values.

3.0 Filter Expression Distribution Process

Figure 2:
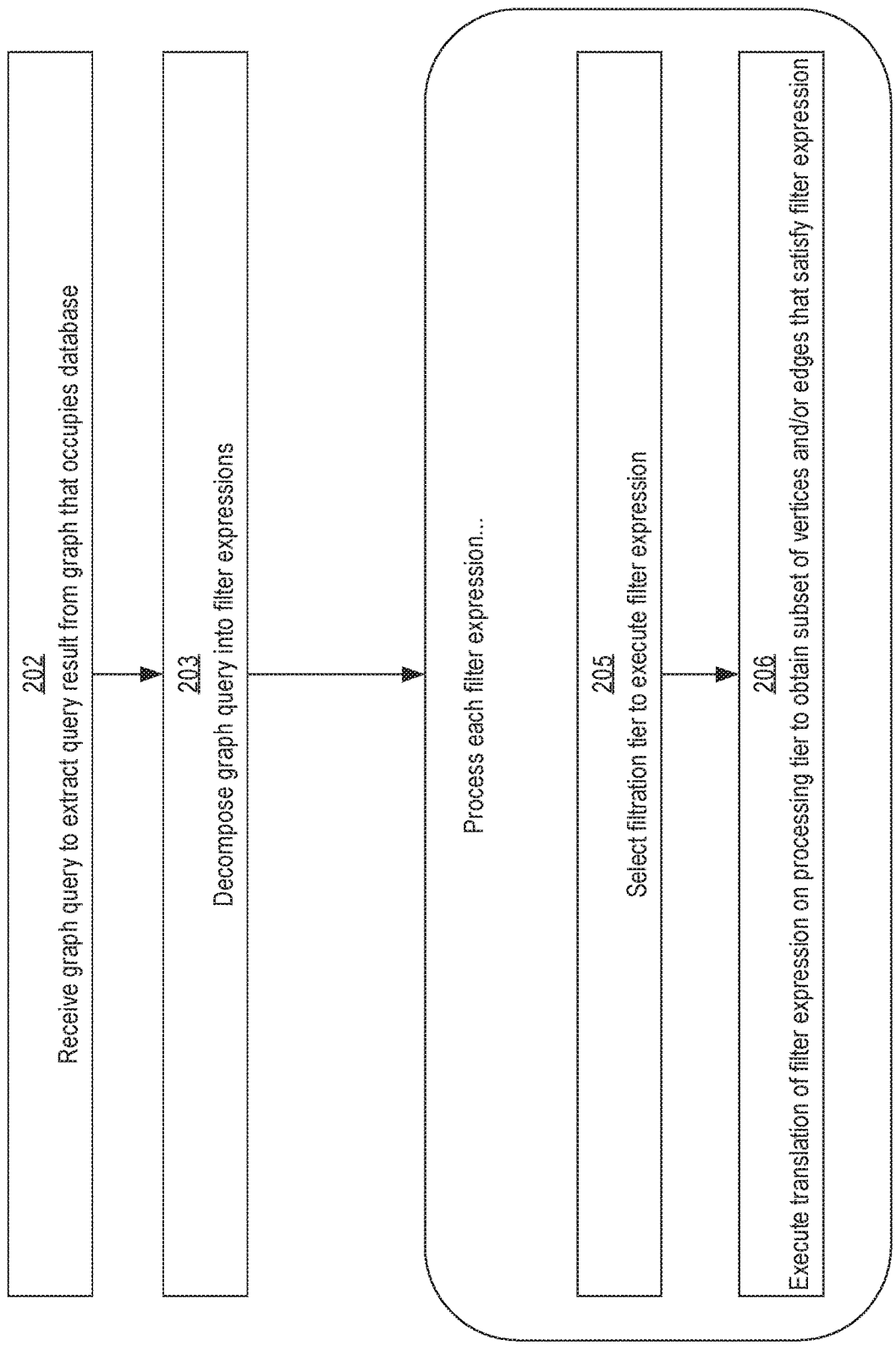
FIG. 2 is a flow diagram that depicts an example process that optimally distributes graph query processing across heterogeneous tiers, in an embodiment.

FIG. 2 is a flow diagram that depicts an example process that optimally distributes graph query processing across heterogeneous tiers. FIG. 2 is discussed with reference to FIG. 1.

3.1 Preparation

Steps 202-203 are preparatory. In step 202, a graph query to extract a query result, from a graph that occupies a database, is received. For example, computer system 100 may host a graph engine that analyzes graph 135 that occupies database 130.

Computer system 100 may receive graph query 105 to extract query result 180 from graph 135. For example, a remote client may submit graph query 105 to computer system 100 in a hypertext transfer protocol (HTTP) request, such as a simple object access (SOAP) or representational state (REST) request.

In step 203, the graph query is decomposed into filter expressions. For example, computer system 100 may tokenize and parse graph query 105 to create an abstract syntax tree (AST). For example, logical operators (e.g. logical-and, logical-or) and relational operators (e.g. equality, greater-than) of an infix notation expression may be non-leaf nodes of the AST. For example, filter expressions 111-114 may be appear as subtrees of the AST.

3.2 Filter Iteration

Steps 205-206 are performed for each of filter expressions 111-114. In step 205, a filtration tier is selected to execute each filter expression.

For example during semantic analysis, computer system 100 may traverse the AST to individually visit each filter expression. Semantic analysis may include detecting which heuristics should be applied to which filter expressions.

For example rules, such as those described elsewhere herein, may consign a filter expression to a particular filtration tier. For example a join, such as for an edge traversal, may be assigned by rule to in-memory evaluator 175.

In an embodiment, filter iteration entails the following two phases, which are marking and decomposition. In an embodiment, this involves walking the AST twice, which is once per phase.

3.2.1 Marking Phase

Figure 3:
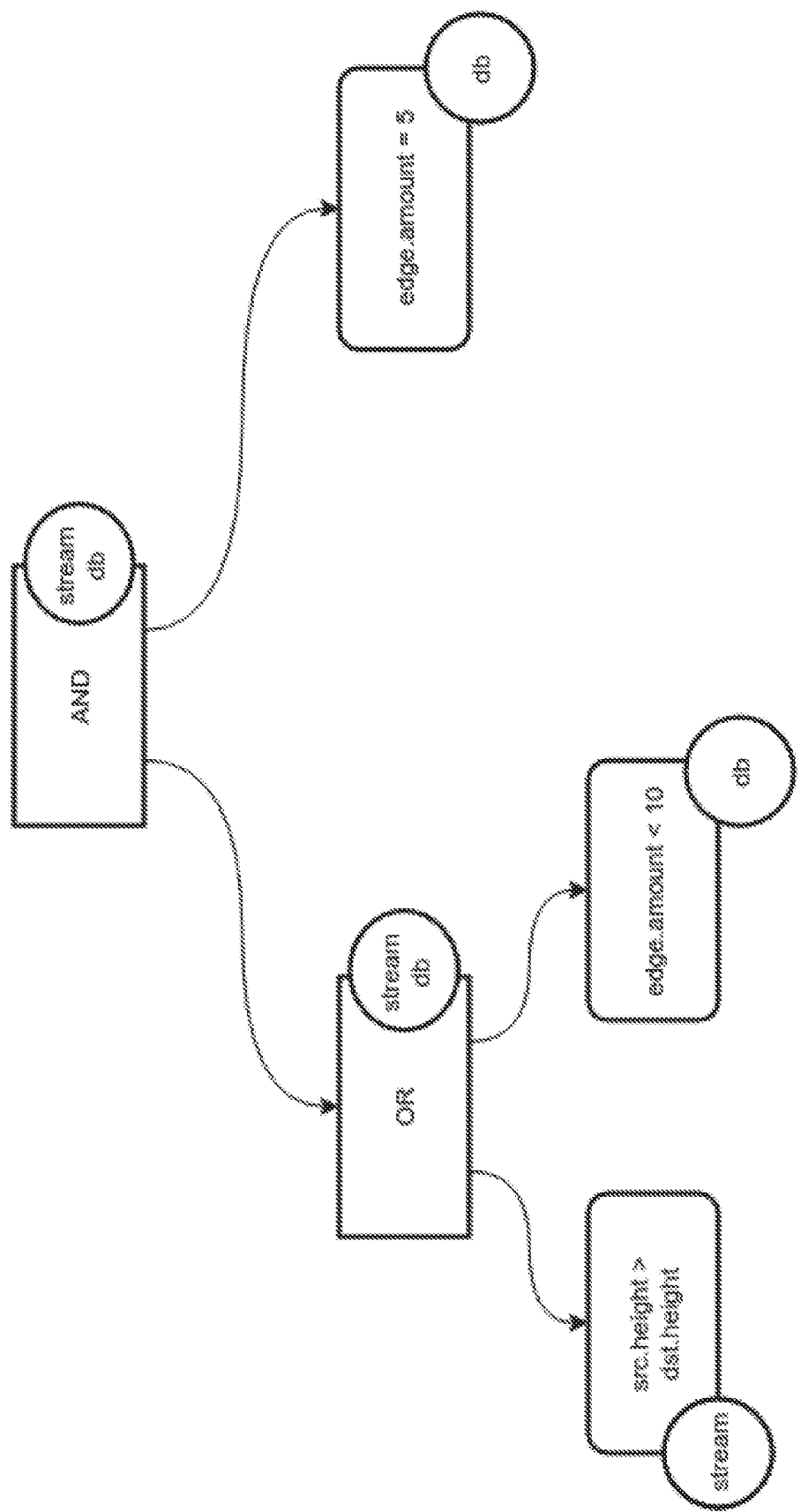
FIG. 3 is a block diagram that depicts an example abstract syntax tree (AST) of a graph query, in an embodiment.

Marking may be the designation of a filtration tier for a filter expression, more or less as explained above. With explanation of FIG. 2 ongoing, FIG. 3 shows an AST of a graph query, such as 105.

Here, the filter expressions are tree leaf nodes and specify comparisons according to relational operators such as '='. Logical operators such as AND are non-leaf nodes.

During step 205, computer system 100 may walk the AST and may use rules and heuristics to mark each leaf with an assigned filtration tier. For example, one leaf is marked as stream, and two leaves are marked as database.

Non-leaf nodes accumulate the union (all) of the marks of its child nodes. For example, the OR node is marked as stream and database.

3.2.1.1 Marking Pseudocode

In an embodiment, the following pseudocode recursively marks an AST:

```
function visit( e: FilterExpression) {
    for each child in e {
        visit(child)
        e.tags = union(e.tags, child.tags)
    }
}
function visit( e: BinaryLogicalExpression ) {
    visit(e.left)
    visit(e.right)
    e.tags = union(e.left.tags, e.right.tags)
}
function visit( e: CompareExpression ) {
    if (contains_no_degree_call(e)) {
        if (contains_at_least_one_constant(e) &&
            references_only_edge_and_vertex(e)) {
            e.tags = ["DB"]
        } else {
            e.tags = ["stream"]
```

```
            }
        } else {
            e.tags = ["in-memory"]
        }
    }
```

3.2.2 Decomposition Phase

During step 205, computer system 100 may walk the AST to extract compound expressions, each of which may be executed on a filtration tier. Unlike marking, which may walk the AST from the bottom (leaves) up, decomposition walks the AST from the top (root node) down.

Each tree node, regardless of which level its occurs within the AST, should be executed on whichever filtration tier the node is marked for, so long as the node is marked for only one tier. It does not matter whether the node is a leaf or not.

For example, a non-leaf node that is marked only for the database is the root of a subtree that should entirely be executed by DBMS 185. Thus, such a subtree may be extracted as a compound expression, but the compound expression should not be further decomposed.

However, decomposing a non-leaf that is marked for multiple tiers is more complicated. Decomposition of a heterogeneously marked non-leaf (subtree) depends on which logical operator does the non-leaf specify.

For example, AND and OR operators have different implications within the filtration pipeline. This is because AND is implied between tiers. Whereas, OR should not span multiple tiers.

For example, DBMS 185 may select coastal cities, and a stream evaluator may discard large cities. Thus, an AND operation is implied such that memory receives cities that are coastal AND small. As such, a heterogeneously marked AND node may be discarded (as implied) and its left and right child subtrees may be separately analyzed for further (recursive) decomposition.

Whereas, a heterogeneously marked OR node should not be decomposed and should instead be executed at the highest (latest in pipeline) marked tier. For example, the OR node of FIG. 3 is marked as stream and database. Because stream evaluator 165 occurs later in the filtration pipeline after DBMS 185, thus the OR node is the root of a subtree that should be wholly executed by stream evaluator 165, even though the subtree contains a child node that is marked as database.

3.2.2.1 Decomposition Pseudocode

In an embodiment, the following pseudocode recursively decomposes an already marked AST. This pseudocode also implements one of De Morgan's Laws, which entail expression rewriting and are explained later herein.

```
function visit(e: FilterExpression, desired_tag: Tag) {
    for each child in e {
        visit(child, desired_tag)
    }
}
function visit(e: UnaryLogicalExpression, desired_tag: Tag) {
    if(e.operator == NOT) {
        number_of_negations++
    }
    visit(e.child, desired_tag)
    if(e.operator == NOT) {
        number_of_negations--
    }
}
function visit(e: BinaryLogicalExpression, desired_tag: Tag) {
    if (e.left.type == BinaryLogicalExpression) {
        visit(e.left, desired_tag)
    }
    if (e.right.type == BinaryLogicalExpression) {
        visit(e.right, desired_tag)
    }
    if(e.left.tags.contain(desired_tag) &&
        e.right.tags.contain(desired_tag)) {
            // do nothing, as expression can be taken without further modification
    } else if(e.left.tags.not_contain(desired_tag) &&
        e.right.tags.not_contain(desired_tag)) {
            remove(e) // no side contains the desired_tag -> remove expression
    } else {
        // one side can be extracted if the operator is an AND.
        // figure out operator and which expression can be extracted
        // and replace this expression with the extracted that has the desired_tag
        operator = e.operator
        // check for De Morgan's law
        if (number_of_nots is odd) {
            if (operator == OR) {
                operator = AND
            } else {
                operator = OR
            }
        }
        if(operator == OR) {
            remove(e) // operator is OR -> remove expression
        } else {
            // operator is AND -> replace this expression with the desired expression
            if(e.left.tags.contain(desired_tag)) {
                replace(e, e.left)
            } else {
                replace(e, e.right)
            }
        }
    }
}
```

3.2.3 Execution

In step 206, a translation of each filter expression executes on the filter expression's assigned filtration tier to obtain a subset of vertices and/or edges that satisfy the filter expression. For example, stream evaluator 165 uses translation 122 to filter (selectively eliminate) unwanted data from stream 160.

For example, data that satisfies translation 122 may be copied into memory 170 for additional filtration. Whereas, data that does not conform to translation 122 may be discarded (not copied from stream 160 into memory 170).

For example for matching on graph data, translations 121-123 may specify property values of a vertex, of its edges, and of its neighbor vertices. For example, in-memory evaluator 175 may execute translation 121, including matching vertex and edge properties, to isolate (select) query result 180 from within memory 170.

4.0 Example Table

Figure 4:
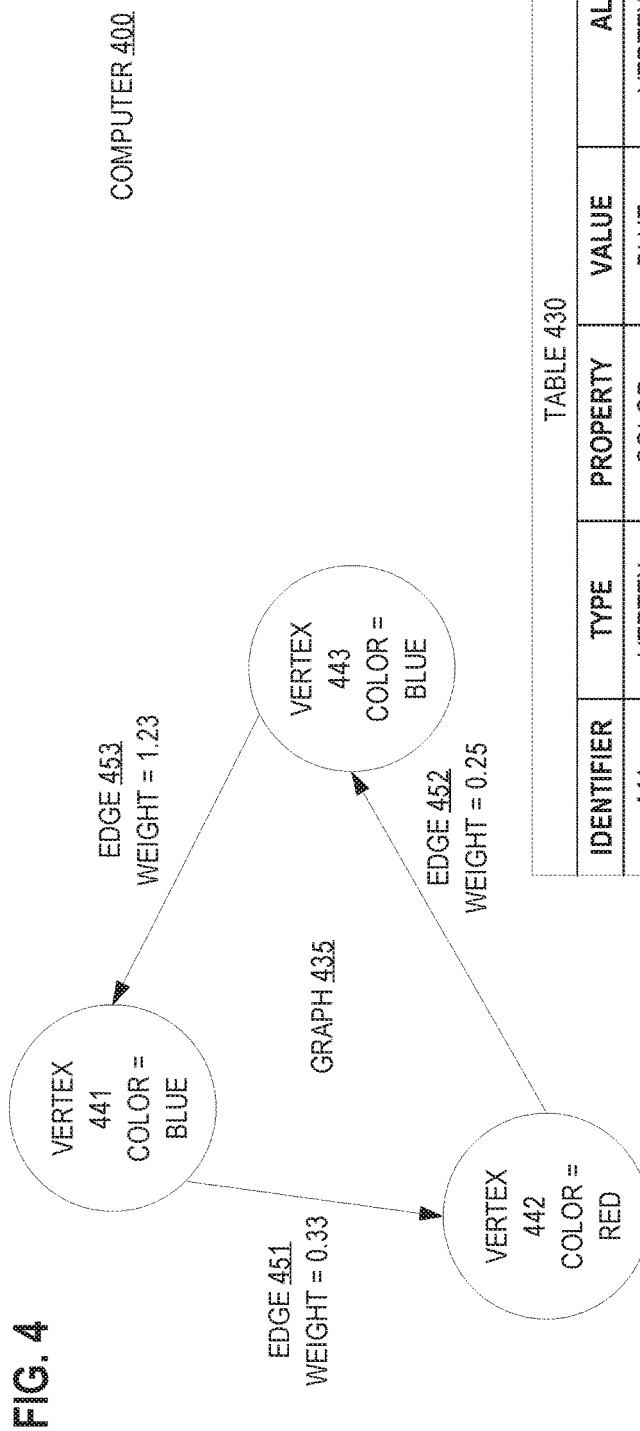
FIG. 4 is a block diagram that depicts an example computer that uses aliases to access property table(s), in an embodiment.

FIG. 4 is a block diagram that depicts an example computer 400, in an embodiment. Computer 400 uses aliases to access property table(s).

Computer 400 may be an implementation of computer system 100. Computer 400 may use relational table(s) as a randomly accessible property store.

For example, table 430 may store graph 435 as property values that are encoded as name-value (key-value) pairs. For example, each table row may be one property of one vertex or edge.

Table 430 is idealized as drawn. Some of the columns of table 430 are demonstrative and may be absent from a compact embodiment.

For example, the Identifier column may be redundant if a separate table records property counts for identified vertices and edges whose properties are stored contiguously in table 430.

In an embodiment not shown, there are two tables 430. One table 430 contains only vertex properties, which are shown as the top rows of table 430. The other table 430 contains only edge properties. In such an embodiment, the Type column may be redundant.

In an embodiment not shown, properties of a same type (e.g. integer) occupy a same table. In an embodiment not shown, properties of a same name occupy a same table. In such an embodiment, the Property column may be redundant.

4.1 Translation

In an embodiment, different filter expressions or property accesses within filter expressions may, in translation, be encoded as aliased table access. For example, querying for blue vertices of graph 435 may be translated into SQL that uses Vertex_Color as an alias of Table 430 when accessing vertex colors. For example, the translation into SQL may be:

```
SELECT Vertex_Color.identifier
FROM Table430 AS Vertex_Color
WHERE Vertex_Color.property='COLOR' AND
   Vertex_Color.value='BLUE' AND
   Vertex_Color.type='VERTEX'
```

The Alias column is demonstrative and redundant. A table alias may be automatically derived from other information. For example, Vertex_Color may be derived from the Type and Property columns, which may themselves be redundant (absent) columns as explained above.

The above translation corresponds to an original graph query have a filter expression such as "vertex.color='BLUE'". Computer 400 may construct and use one or more data dictionaries that map property names as keys to table aliases as values. Computer 300 may use such a dictionary to generate the above SQL translation.

Furthermore, the above translation returns only identifiers (keys) of vertices. However, the original graph query may request additional properties of matching vertices.

4.2 Projection

The above SQL translation can be enhanced to return more properties of matching vertices. For example:

```
SELECT * FROM Table430 WHERE vertexIdentifier IN
   ( SELECT Vertex_Color.identifier AS vertexIdentifier
   FROM Table430 AS Vertex_Color
   WHERE Vertex_Color.property='COLOR' AND
      Vertex_Color.value='BLUE' AND
      Vertex_Color.type='VERTEX' )
```

4.3 Template

Furthermore, query translations may be templated. For example, computer 400 may perform string substitution upon the following template to achieve dynamic in-lining of actual name of tables, aliases, and properties:

SELECT*FROM ${vertexTableName}
WHERE ${vertexKey} IN (${innerQuery})

Each ${name} within the template may be a placeholder for inserting actual names. For example, this template may be used to query for a color as above or for other queries for vertices.

4.4 Relational Join

A graph query may access multiple properties of a vertex or edge. However because each property may be stored in a separate row, as shown in table 430, a relational join may be needed to access the multiple properties.

Computer 400 may generate join clauses to achieve the needed relational joins. For example a watermelon (not shown) is green outside and red inside according to a graph query such as "vertex.outside='green' and vertex.inside='red'". The join may translate in bold as:

```
SELECT Vertex_Inside.identifier
FROM Table430 AS Vertex_Inside, Table430 AS Vertex_Outside
WHERE Vertex_Inside.identifier=Vertex_Outside.identifier
AND
   Vertex_Inside.property='inside' AND
   Vertex_Inside.value='red' AND
   Vertex_Outside.property='outside' AND
   Vertex_Outside.value='green' AND
   Vertex_Color.type='VERTEX'
```

4.4.1 Edge Traversal

Edge traversal may involve one or two joins. For example against graph 435 may be applied a graph query such as "vertex.color='BLUE' and edge.destination.color='RED'". For example the edge traversal in the graph query may need three translated joins, shown in bold:

```
SELECT Vertex_Inside.identifier
FROM Table430 AS Vertex_Color,
   Table430 AS Edge_Source,
   Table430 AS Edge_Destination,
   Table430 AS Destination_Color
WHERE Vertex_Color.property='COLOR' AND
   Vertex_Color.value='BLUE' AND
   Vertex_Color.identifier=Edge_Source.value AND
   Edge_Source.property='SOURCE' AND
   Edge_Source.identifier=Edge_Destination.indentifier
AND Edge_Destination.property='DESTINATION' AND
   Edge_Destination.value=Destination_Color.identifier
AND Destination_Color.property='COLOR' AND
   Destination_Color.value='RED' AND
   Vertex_Color.type='VERTEX'
```

Executing this SQL translation will return a subgraph as a result containing vertices 441-442 connected by edge 451. Unlike most properties, the source and destination properties of edges are topological and thus are directly involved with graph traversal. As an optimization, source and destination properties may be refactored into discrete source and destination columns of an edge or topology table.

5.0 Tier Reassignment

Figure 5:
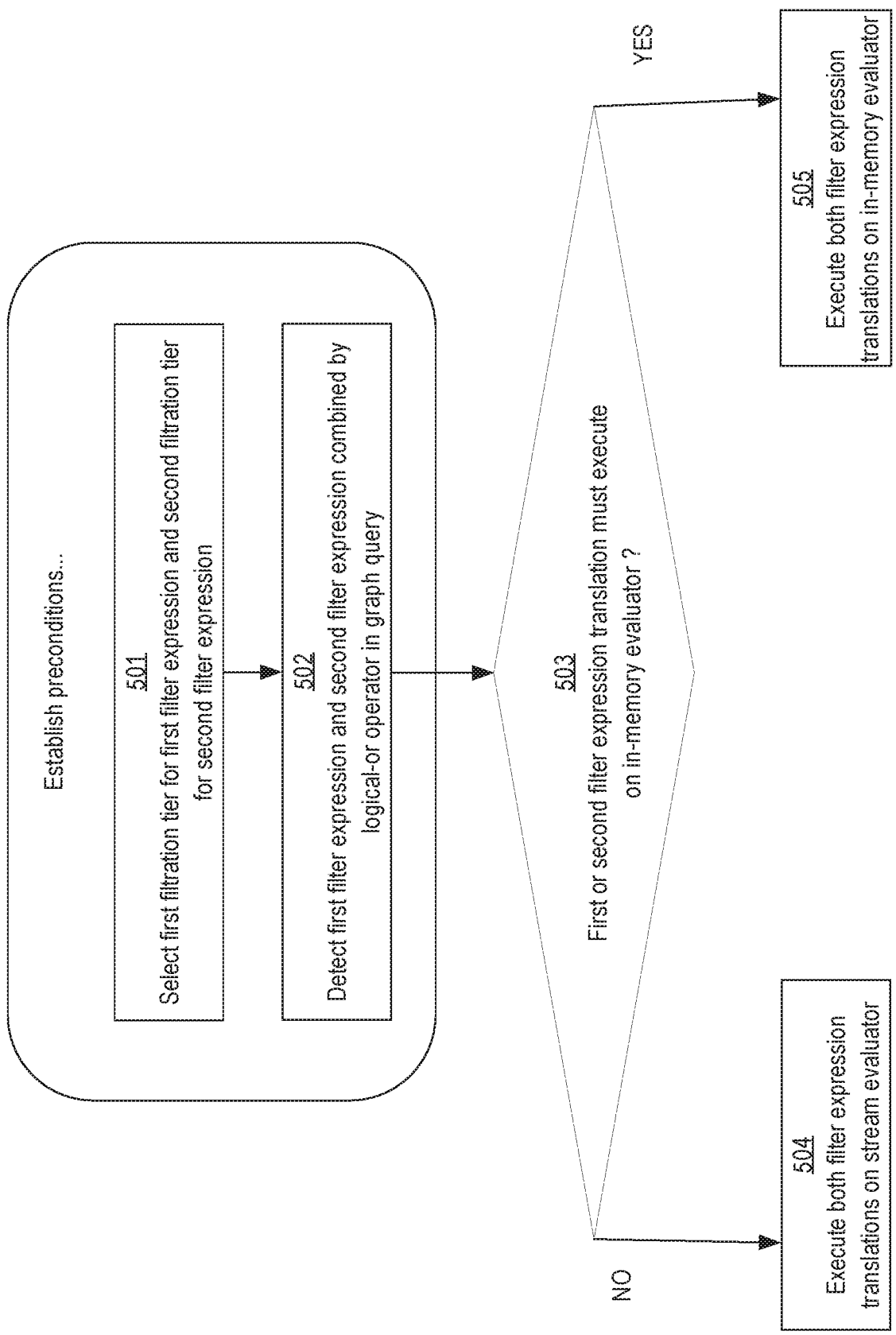
FIG. 5 is a flow diagram that depicts an example process that overrides markings to accommodate disjunction between tiers, in an embodiment.

FIG. 5 is a flow diagram that depicts an example process that overrides markings to accommodate disjunction between tiers. FIG. 5 is discussed with reference to FIG. 3.

Disjunction between tiers may occur when an OR node is heterogeneously marked within an AST. This scenario is introduced above for FIG. 3 and discussed further here.

Steps 501-502 are preparatory and establish preconditions of heterogeneous disjunction. In step 501, a separate filtration tier is selected for each of two filter expressions.

For example, the OR node of FIG. 3 has two child nodes. The left child is marked as stream, whereas the right child is marked as database.

In step 502, a logical-or operator is detected as directly combining the two filter expressions. For example, the OR node is detected as the direct parent of the left and right children.

Step 502 effectively detects that the OR node is the root of a subtree that should not be decomposed further and should be executed only by one tier, despite having children marked for different tiers. Which filtration tier should execute the subtree depends on steps 503-505.

In step 503, whether one child is marked as memory is checked. For example, neither of the children of the OR node of FIG. 3 is marked as memory.

Steps 504-505 are mutually exclusive. Which of steps 504-505 is executed depends on the result of step 503.

If either child is marked as memory, step 505 is executed. Otherwise, step 504 is executed.

In step 504, both filter expressions are executed by the stream evaluator. For example, the OR node subtree of FIG. 3 is entirely executed by the stream evaluator.

Furthermore, FIG. 3 has a third (rightmost) leaf "edge.amount=5" that is not part of the OR subtree and may still be executed by the DBMS. Thus executing the AST occurs as follows.

The third leaf is executed by the DBMS to produce a stream. The tree root of the AST is a heterogeneously marked AND, which is implied (discarded).

The stream evaluator consumes the partially filtered stream and applies the OR subtree of filtration. Because FIG. 3 requires no memory tier filtration, the stream evaluator emits the query result, although an implementation may or may not pass the query result thru the rest of the filtration pipeline, which includes the memory and in-memory evaluator.

If either child of the OR node were marked (not as shown) as memory, then step 505 executes instead of step 504. Step 505 executes both filter expressions on the in-memory evaluator. For example, the whole OR subtree would be executed by the in-memory evaluator.

6.0 De Morgan's Laws

Figure 6:
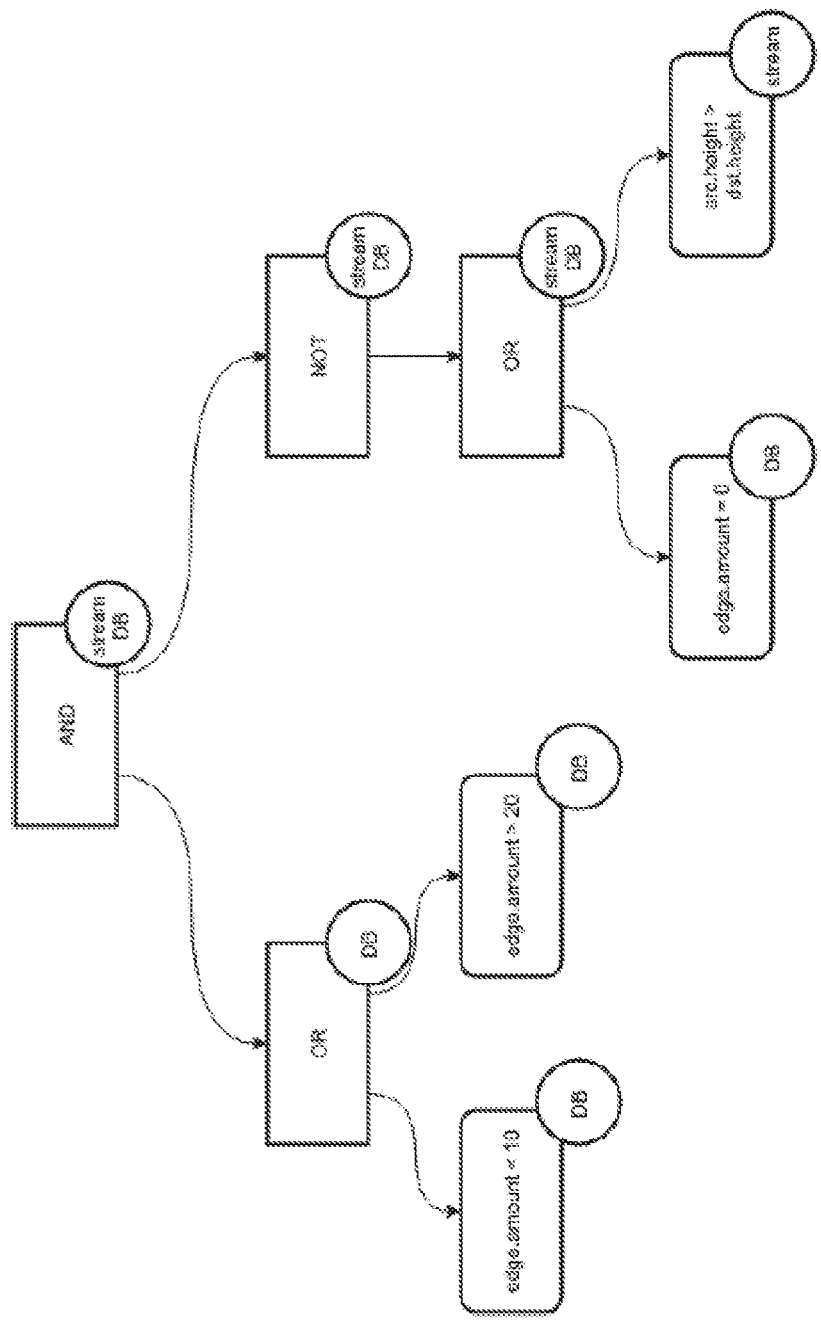
FIG. 6 is a block diagram that depicts an example suboptimal AST of a graph query that is suited to De Morgan's Laws, in an embodiment.

FIG. 6 shows a suboptimal AST of a graph query that is suited to De Morgan's Laws. De Morgan's Laws recognize that conjunction (AND) and disjunction (OR) are interchangeable via negation (NOT operator).

De Morgan's Laws hold that NOT (X AND Y) is equivalent to NOT X OR NOT Y. Furthermore, NOT (X OR Y) is equivalent to NOT X AND NOT Y.

These four compound expressions are patterns that may or may not match an actual subtree. Furthermore, multiple contiguous NOT operators may be elided before analyzing for De Morgan's Laws.

For example, NOT NOT NOT Z is equivalent to NOT Z. An odd amount of NOTs reduce to a single NOT. An even amount of NOTs can be eliminated completely.

The shown AST has a subtree that matches the NOT (X OR Y) pattern. That subtree is suitable for optimization.

6.1 Applying De Morgan

Figure 7:
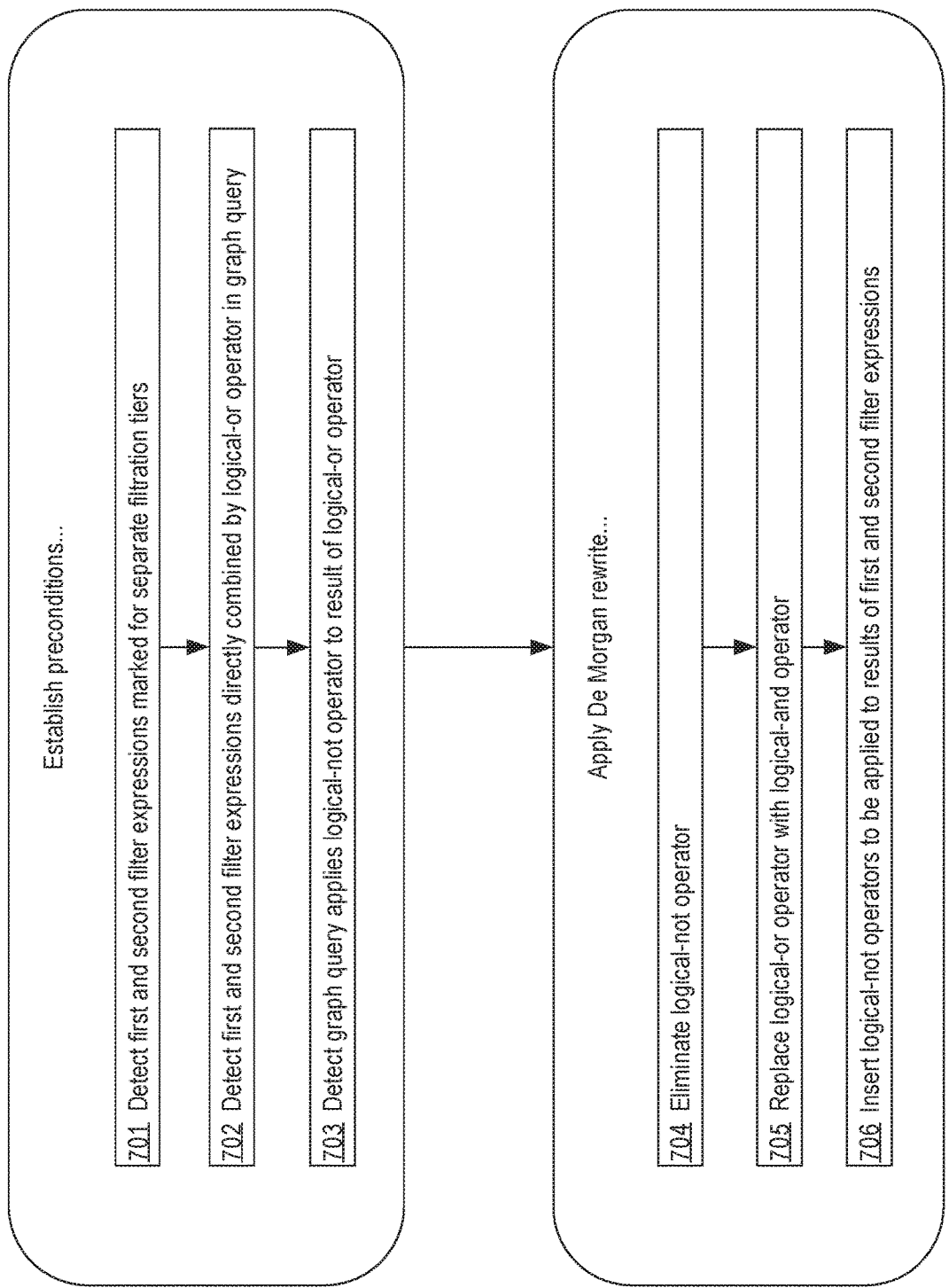
FIG. 7 is a flow diagram that depicts an example process that optimally rewrites a compound expression according to De Morgan's Laws, in an embodiment.

FIG. 7 is a flow diagram that depicts an example process that optimally rewrites a compound expression according to De Morgan's Laws. FIG. 7 is discussed with reference to FIG. 6.

Techniques herein exploit some De Morgan equivalents being better suited (more efficient) to the filtration pipeline. Thus, optimization may involve rewriting a compound expression according to De Morgan's Laws.

6.1.1 Pattern Detection

Steps 701-703 are preparatory and establish preconditions of optimization. They recognize a subtree that fits a De Morgan pattern.

In some embodiments, steps 701-703 may be reordered relative to each other. For example, their shown ordering is discussed for demonstration. However, a reverse ordering of them may be more practical (efficient).

Step 701 detects that first and second filter expressions of a graph query are marked for separate filtration tiers. For example in the lower right of FIG. 6 are two leaves "edge.amount=0" and "src.height>dst.height".

One of these leaves is marked as database. The other leaf is marked as stream.

Step 702 detects that both filter expressions are directly combined by a logical-or operator. For example, both leaves are children of an OR node.

Step 703 detects that the logical-or is a direct child of a logical-not. For example, the OR node is sole child of a NOT node in FIG. 6.

The effect of steps 701-703 is to recognize a subtree having four (in this example) nodes and matching the NOT(X OR Y) pattern mentioned above. This subtree is suboptimal for a filtration pipeline.

For example, the OR node is heterogeneously marked. According to the pipeline rules and heuristics discussed elsewhere above, a heterogeneous OR would not be decomposed and would instead be pulled up to its highest (less efficient) tier, which in this case is the stream evaluator, even though the left child of the OR is marked as database.

Thus in original suboptimal form, none of the NOT subtree would be executed in the (efficient) DBMS. However, De Morgan's Laws encourage rewriting (optimizing) the NOT subtree into a more efficient form that can push some filtration down to the DBMS.

6.1.2 De Morgan Rewrite

As discussed above, NOT (X OR Y) is equivalent to (and can be written as) NOT X AND NOT Y. This rewrite occurs in phases, which are steps 704-706 that together apply one of De Morgan's Laws.

Step 704 eliminates the original logical-not operator. For example, NOT(X OR Y) becomes X OR Y.

Step 705 replaces the logical-or operator with a logical-and operator. For example, X OR Y becomes X AND Y. Thus, rewriting yields a heterogeneous AND node (not shown).

Step 706 inserts logical-not operators to the first and second filter expressions. For example, X AND Y becomes NOT X AND NOT Y.

As discussed elsewhere above, a heterogeneous AND node is implied between filtration tiers, can be eliminated, and its children separately analyzed for decomposition. Thus, "NOT (edge.amount=0 OR src.height>dst.height)" is rewritten as "NOT (edge.amount=0) AND NOT (src.height>dst.height)".

Because of the effect of inversion upon the relational operators, the NOTs may be further simplified to "edge.amount<>0 AND src.height<=dst.height". Elimination (as implied) of the heterogeneous AND means that the DBMS may execute "edge.amount<>0", and then the stream evaluator may skim (execute) "src.height<=dst.height". Thus, a compound expression that would have originally needed pulling all of itself up to the stream evaluator may instead be optimally split (decomposed) into two filter expressions, one of which can be pushed down to the (efficient) DBMS.

7.0 Stream Evaluation Process

Figure 8:
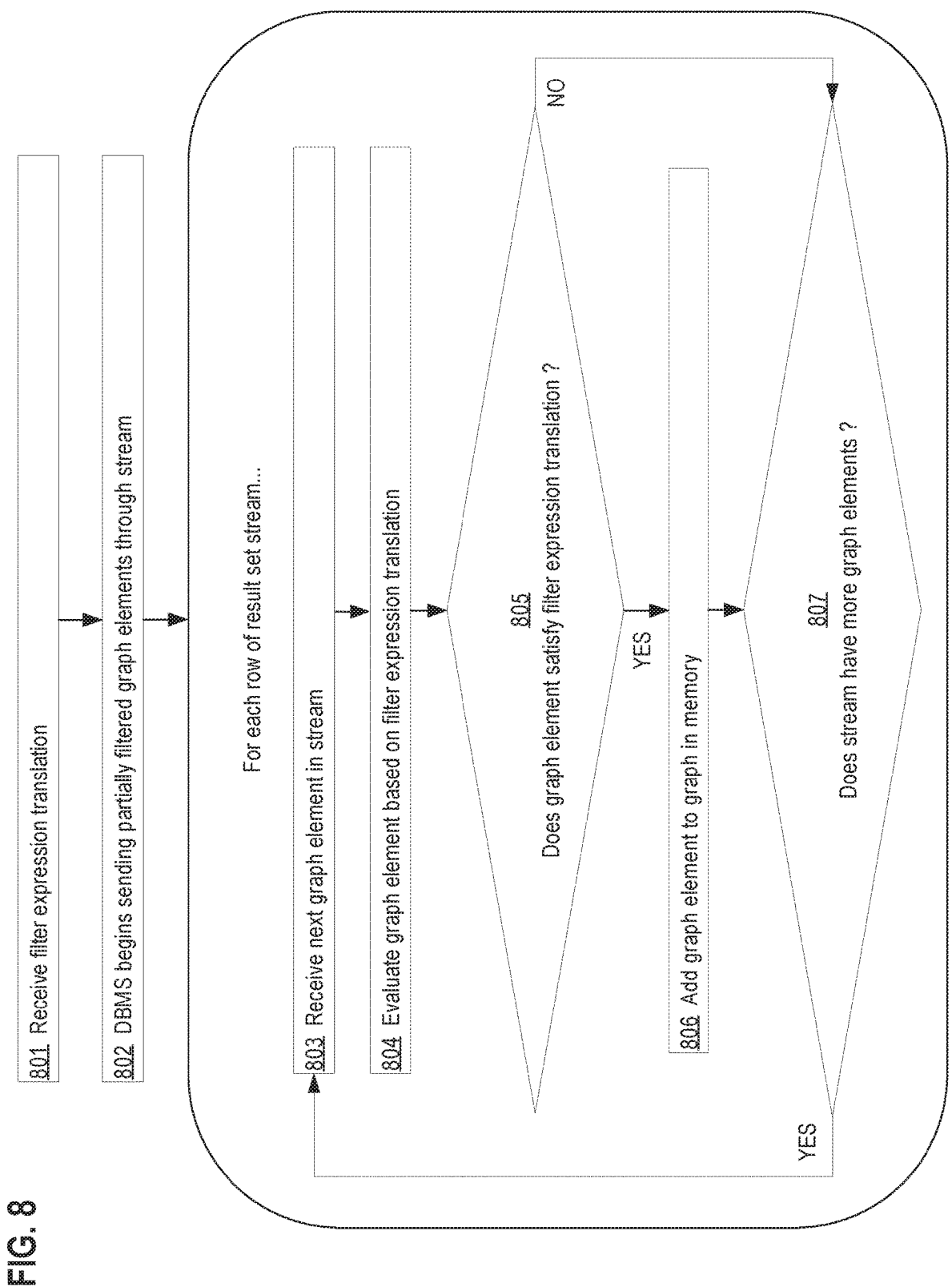
FIG. 8 is a flow diagram that depicts an example stream evaluation process, in an embodiment.

FIG. 8 is a flow diagram that depicts an example stream evaluation process. FIG. 8 is discussed with reference to FIG. 1.

A precondition of FIG. 8 are that translations 121-123 were generated, and DBMS 185 received translation 123. Additional preparation occurs in steps 801-802.

Relative ordering of steps 801-802 need not be significant. For example, either of steps 801-802 may be performed first, or both may be concurrently performed.

In step 801, a stream evaluator receives a filter expression translation. For example, computer system 100 may provide translation 122 as an input parameter while invoking stream evaluator 165. Computer system 100 may also provide stream 160 as another input parameter.

In step 802, a DBMS begins sending rows of a result set to a stream. For example, DBMS 185 may use translation 123 to filter graph 135.

For example, translation 123 may be an SQL query whose execution selects and emits graph elements. In embodiments the graph elements are encoded as tuples of a result set. DBMS 185 may put each graph element into stream 160, individually, in groups, or all at once.

In steps 803-807, stream evaluator 165 performs filtration. Steps 803-807 are repeated for each graph element in stream 160.

In step 803, the next graph element is received from the stream. For example, stream evaluator 165 receives a next graph element from stream 160.

In step 804, the filter expression translation is used to evaluate the current graph element. For example, stream evaluator 165 applies translation 122 to the current graph element.

In step 805, the stream evaluator detects whether or not the current graph element satisfies the filter expression translation. For example, stream evaluator 165 may apply translation 122 to the current graph element to obtain a Boolean result value.

Based on that Boolean result, stream evaluator 165 decides which step to perform next. If the current graph element satisfies translation 122, then stream evaluator 165 proceeds to step 806. Otherwise, step 806 is skipped for the current graph element.

In step 806, the current graph element is stored into memory. For example, stream evaluator 165 may store the current graph element into memory 170.

For example, stream evaluator 165 may assemble an intermediate (partially filtered) graph within memory 170. Stream evaluator 165 may insert the current graph element into the intermediate graph.

In step 807, the stream evaluator detects whether or not the stream is exhausted. For example, stream evaluator 165 may detect whether or not stream 160 has more pending graph elements.

If stream 160 is exhausted, then stream evaluator 165 may terminate. Whereas if another pending graph element is available in stream 160, then stream evaluator 165 repeats steps 803-807 for each remaining graph element.

8.0 In-Memory Evaluation Process

Figure 9:
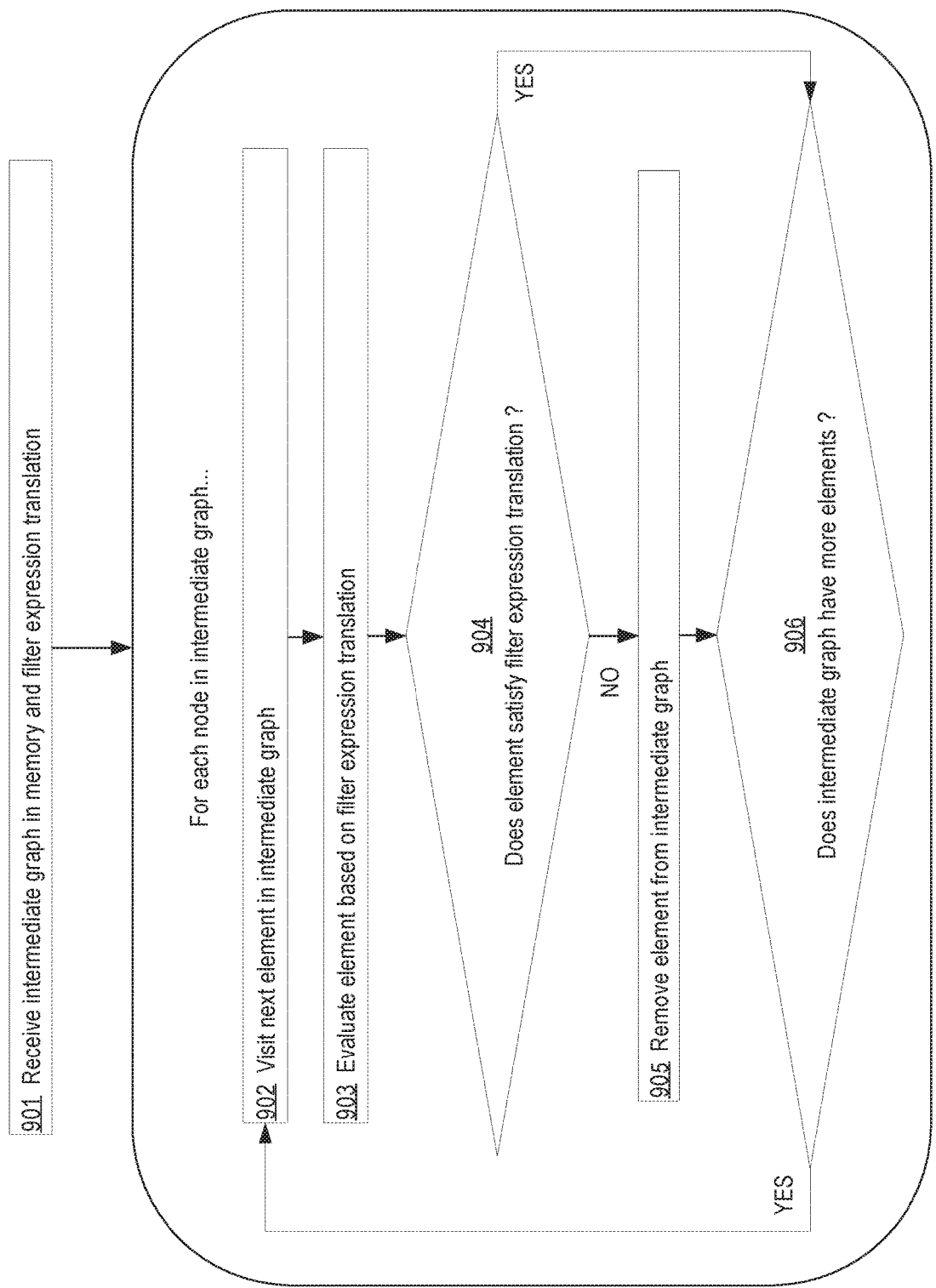
FIG. 9 is a flow diagram that depicts an example in-memory evaluation process, in an embodiment.

FIG. 9 is a flow diagram that depicts an example in-memory evaluation process. FIG. 9 is discussed with reference to FIG. 1.

Step 901 is preparatory. In step 901, an intermediate (partially filtered) graph in memory and a filter expression translation are received.

For example, computer system 100 may provide translation 121 and the intermediate graph stored in memory 170 by stream evaluator 165 as input parameters while invoking in-memory evaluator 175.

Steps 902-906 are repeated for each element in the intermediate graph. For example, in-memory evaluator 175 may sequentially visit each element of the intermediate graph.

In step 902, the next element in the intermediate graph is visited. For example, in-memory evaluator 175 may control a graph iterator or be notified by inversion of control to identify a next graph element within memory 170.

In step 903, the current graph element is evaluated based on the filter expression translation. For example, in-memory evaluator 175 may apply translation 121 to the current graph element to obtain a Boolean result value.

Based on that Boolean result, in-memory evaluator 175 decides which step to perform next. If the current graph element does not satisfy translation 121, then in-memory evaluator 175 proceeds to step 905. Otherwise, step 905 is skipped for the current graph element.

In step 905, the current graph element is removed from the intermediate graph in memory. In embodiments, in-memory evaluator 175 may prune the intermediate graph by actually removing (or merely marking as removed) the current graph element from the intermediate graph. In embodiments, in-memory evaluator 175 may instead copy the current graph element into a final result graph consisting of graph elements that satisfy translation 121.

In step 906, the in-memory evaluator detects whether or not the intermediate graph is exhausted. For example, in-memory evaluator 175 may detect whether or not the intermediate graph has more graph elements that have not yet been visited.

If the intermediate graph is exhausted, then in-memory evaluator 175 may terminate. Whereas if another unvisited element is available in the intermediate graph, then in-memory evaluator 175 repeats steps 902-906 for each remaining unvisited graph element.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
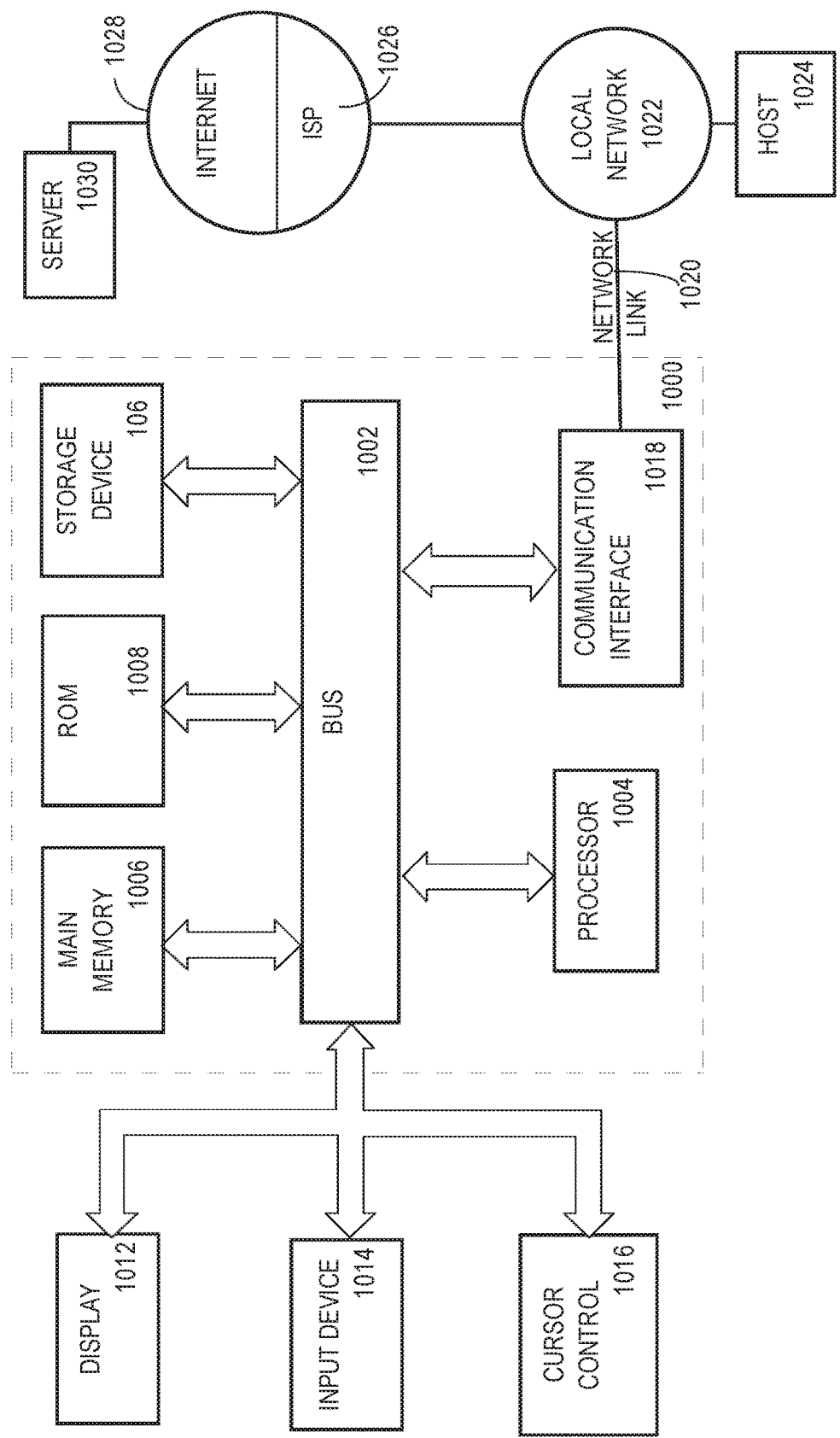
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 106, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 106. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 106. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 106 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 106, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
    executing a graph query to be applied to content of a computerized data store by:
        automatically decomposing the graph query into at least a first filter expression and a second filter expression;

executing the first filter expression on a database management system (DBMS) tier that comprises a DBMS;
performing pipeline concurrency by at least executing, concurrent to said executing the first filter expression on the DBMS tier, the second filter expression on another processing tier, wherein:
data in the other processing tier comprises data retrieved from the DBMS tier;
said data in the other processing tier exceeds available memory in the other processing tier.

2. The method of claim 1 wherein said data retrieved from the DBMS tier comprises extensible markup language (XML).

3. The method of claim 1 wherein said executing the first filter expression on the DBMS tier comprises sending an XML query to the DBMS for execution.

4. The method of claim 1 wherein said executing the second filter expression on the other processing tier comprises
performing native object deserialization.

5. The method of claim 1 wherein the first filter expression cannot be context free.

6. The method of claim 1 wherein the DBMS tier and the other processing tier reside on one selected from the group consisting of: separate computers and a same computer.

7. The method of claim 1 wherein said executing the second filter expression on the other processing tier comprises unmarshalling said data in the other processing tier into data binding objects.

8. The method of claim 1 wherein said executing the second filter expression on the other processing tier comprises using a sliding window to store a portion of said data in the other processing tier.

9. The method of claim 1 wherein said executing the second filter expression on the other processing tier comprises detecting that said executing the second filter expression has quadratic complexity.

10. A method comprising:
executing a graph query to be applied to content of a computerized data store by:
automatically decomposing the graph query into at least a first filter expression and a second filter expression;
executing the first filter expression on a database management system (DBMS) tier that comprises a DBMS;
executing the second filter expression on another processing tier, wherein:
data in the other processing tier comprises data retrieved from the DBMS tier, and said executing the second filter expression on the other processing tier comprises
not storing said data in the other processing tier unless a streaming XML parser detects that said data in the other processing tier satisfies said second filter expression.

11. The method of claim 1 wherein:
said data in the other processing tier comprises a first portion and a second portion;
said executing the second filter expression on the other processing tier comprises concurrently processing the first portion and the second portion by respective cores of a processor.

12. One or more non-transitory computer-readable media storing instructions that, when executed by one or more processors, cause:
executing a graph query to be applied to content of a computerized data store by:
automatically decomposing the graph query into at least a first filter expression and a second filter expression;
executing the first filter expression on a database management system (DBMS) tier that comprises a DBMS;
performing pipeline concurrency by at least executing, concurrent to said executing the first filter expression on the DBMS tier, the second filter expression on another processing tier, wherein:
data in the other processing tier comprises data retrieved from the DBMS tier;
said data in the other processing tier exceeds available memory in the other processing tier.

13. The one or more non-transitory computer-readable media of claim 12 wherein said data retrieved from the DBMS tier comprises extensible markup language (XML).

14. The one or more non-transitory computer-readable media of claim 12 wherein said executing the first filter expression on the DBMS tier comprises sending an XML query to the DBMS for execution.

15. The one or more non-transitory computer-readable media of claim 12 wherein said executing the second filter expression on the other processing tier comprises at least one selected from the group consisting of:
a) a relational join,
b) native object deserialization,
b) unmarshalling said data in the other processing tier into data binding objects,
c) a sliding window storing a portion of said data in the other processing tier, and
d) detecting that said executing the second filter expression has quadratic complexity.

16. The one or more non-transitory computer-readable media of claim 12 wherein the first filter expression cannot be context free.

17. The one or more non-transitory computer-readable media of claim 12 wherein the DBMS tier and the other processing tier reside on one selected from the group consisting of: separate computers and a same computer.

18. One or more non-transitory computer-readable media storing instructions that, when executed by one or more processors, cause:
executing a graph query to be applied to content of a computerized data store by:
automatically decomposing the graph query into at least a first filter expression and a second filter expression;
executing the first filter expression on a database management system (DBMS) tier that comprises a DBMS;
executing the second filter expression on another processing tier, wherein:
data in the other processing tier comprises data retrieved from the DBMS tier, and
said executing the second filter expression on the other processing tier comprises at least one selected from the group consisting of:
a) not storing said data in the other processing tier unless a streaming XML parser detects that said data in the other processing tier satisfies said second filter expression, and
b) generating a logical graph or a logical tree.

19. The one or more non-transitory computer-readable media of claim 12 wherein:
said data in the other processing tier comprises a first portion and a second portion;
said executing the second filter expression on the other processing tier comprises concurrently processing the first portion and the second portion by respective cores of a processor.

20. A method comprising:
executing a graph query to be applied to content of a computerized data store by:
automatically decomposing the graph query into at least a first filter expression and a second filter expression;
executing the first filter expression on a database management system (DBMS) tier that comprises a DBMS;
executing the second filter expression on another processing tier, wherein:
   data in the other processing tier comprises data retrieved from the DBMS tier, and
   said executing the second filter expression on the other processing tier comprises generating one selected from the group consisting of a logical graph and a logical tree.

* * * * *

UNITED STATES PATENT AND TRADEMARK OFFICE
CERTIFICATE OF CORRECTION

| | |
|---|---|
| PATENT NO. | : 11,294,899 B2 |
| APPLICATION NO. | : 16/548687 |
| DATED | : April 5, 2022 |
| INVENTOR(S) | : Weld et al. |

It is certified that error appears in the above-identified patent and that said Letters Patent is hereby corrected as shown below:

On the Title Page

On page 2, Column 2, item (56) under Other Publications, Line 1, delete "U.S," and insert -- U.S. --, therefor.

In the Specification

In Column 1, Line 33, delete "nonvolatile" and insert -- non-volatile --, therefor.

In Column 1, Lines 55-56, delete "persistence" and insert -- persistence. --, therefor.

In Column 4, Line 57, delete "Sparql,)(Path," and insert -- Sparql, XPath, --, therefor.

In Column 11, Line 21, delete "Table 430" and insert -- Table430 --, therefor.

In Column 11, Line 62, delete "SELECT*FROM" and insert -- SELECT * FROM --, therefor.

In the Claims

In Column 20, Line 8, in Claim 12, delete "wherein;" and insert -- wherein: --, therefor.

In Column 20, Line 26, in Claim 15, delete "b)" and insert -- c) --, therefor.

In Column 20, Line 28, in Claim 15, delete "c)" and insert -- d) --, therefor.

In Column 20, Line 30, in Claim 15, delete "d)" and insert -- e) --, therefor.

Signed and Sealed this
Sixteenth Day of August, 2022

Katherine Kelly Vidal
*Director of the United States Patent and Trademark Office*